Patented Feb. 16, 1932

1,845,755

UNITED STATES PATENT OFFICE

WALTER KROPP, OF ELBERFELD, NEAR COLOGNE-ON-THE-RHINE, GERMANY, ASSIGNOR TO I. G. FARBENINDUSTRIE AKTIENGESELLSCHAFT, OF FRANKFORT-ON-THE-MAIN, GERMANY

NEW ACROLEIN CONDENSATION PRODUCT

No Drawing. Application filed March 6, 1926, Serial No. 92,952, and in Germany August 6, 1925.

The present invention concerns the manufacture of technically valuable compounds by the condensation of α-, β-substituted acrolein with aromatic bases, the products being obtained in good yield in spite of the tendency of the α-substitution to hinder the reaction. The new products result by the simple interaction of the components and may be designated as acrolein Schiff's bases. They are intended to find application as accelerators in the vulcanization of rubber and as intermediate compounds for the manufacture of technically important substances. The new compounds are also characterized by additional valuable properties by virtue of which they may be employed to protect rubber goods against deterioration due to age. The new products having probably the following general formula $$H-C=C-CH=N$$
$$\phantom{H-C=}|\phantom{=C-}|\phantom{CH=}|$$
$$\phantom{H-C=}R_1\phantom{C-}R_2\phantom{CH=}R_3$$

wherein $R_1$ and $R_2$ stand for alkyl groups and $R_3$ stands for an aromatic nucleus are generally oils being soluble with difficulty in water and being soluble in organic solvents.

The following examples will serve to illustrate my invention:—

Example 1

To 39 parts by weight of α-ethyl-β-propyl-acrolein dissolved in 60 volumes of benzene 21 parts by weight of aniline in 25 volumes of benzene are added, whereupon heating is effected under reflux on the water bath for from 3 to 4 hours. In the course of the reaction water separates out. The benzene and water are eliminated and the residue is then heated for several hours at 130° C. in a vacuum of 12 mm. of mercury. The residue is liquid and is soluble with difficulty in water and in dilute acetic acid, but easily soluble in organic solvents. It has most probably the following chemical constitution:

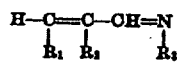

Example 2

200 parts by weight of aniline are mixed with 200 parts by weight of crude α-ethyl-β-propyl-acrolein (as obtained from normal butyl aldehyde by stirring with dilute caustic soda lye until the whole of the butyl aldehyde has disappeared). Owing to the reaction the mixture becomes heated and after some minutes water separates out. The product is then heated for from 1 to 2 hours first on a water bath and subsequently on an oil bath to 140° C. after which the excess of aniline is removed in a vacuum at 145° C., an oily residue remaining

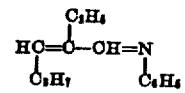

Example 3

150 parts by weight of α-isopropyl-β-isobutyl-acrolein are mixed with 120 parts by weight of aniline, 50 parts by weight of anhydrous zinc chloride are added and the whole is heated on a water bath for several hours. The zinc chloride is then removed by extraction with water and the remaining oil, if desired after solution in benzene is heated in a vacuum for several hours at 140° C. Instead of zinc chloride other condensing agents may be employed. The product has most probably the formula:

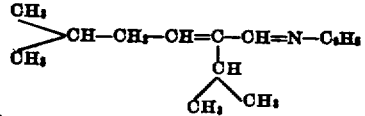

I claim:—

1. The process which comprises causing an alpha-beta-di-alkyl-substituted acrolein to react with a primary aromatic amine in the presence of an inert solvent and an agent capable of exerting a condensing action.

2. A process for the manufacture of condensation products from an alpha-beta-di-alkyl-substituted acrolein with a primary aromatic amine consisting in the interaction of these components in the presence of a condensation agent at a temperature between about 80° C. and about 140° C.

3. The process which comprises causing α-ethyl-β-propyl-acrolein to react upon aniline at a temperature between about 80° C. and about 140° C.

4. As a new product the compound of the probable formula:

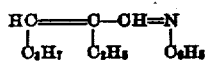

being an oily substance, difficultly soluble in water, soluble in organic solvents and being valuable accelerators in the vulcanization of rubber.

5. The process which comprises causing alpha-ethyl-beta-propyl-acrolein to react upon a primary aromatic amine.

6. As new products, the compounds of the general formula:

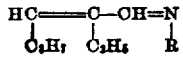

wherein R stands for an aromatic nucleus, being generally oils difficultly soluble in water, soluble in organic solvents and being valuable accelerators in the vulcanization of rubber.

In testimony whereof I have hereunto set my hand.

WALTER KROPP.

4. As a new product the compound of the probable formula:

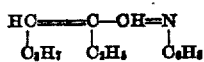

being an oily substance, difficultly soluble in water, soluble in organic solvents and being valuable accelerators in the vulcanization of rubber.

5. The process which comprises causing alpha-ethyl-beta-propyl-acrolein to react upon a primary aromatic amine.

6. As new products, the compounds of the general formula:

wherein R stands for an aromatic nucleus, being generally oils difficultly soluble in water, soluble in organic solvents and being valuable accelerators in the vulcanization of rubber.

In testimony whereof I have hereunto set my hand.

WALTER KROPP.

DISCLAIMER 1,845,755.—*Walter Kropp*, Elberfeld, near Cologne-on-the-Rhine, Germany. NEW ACROLEIN CONDENSATION PRODUCT. Patent dated February 16, 1932. Disclaimer filed June 22, 1934, by the assignee, *I. G. Farbenindustrie Aktiengesellschaft*.

Therefore, enters this disclaimer to certain of the claims of the above identified patent, namely, claims 4, 5 and 6.

[*Official Gazette July 24, 1934.*]

DISCLAIMER 1,845,755.—*Walter Kropp*, Elberfeld, near Cologne-on-the-Rhine, Germany. NEW ACROLEIN CONDENSATION PRODUCT. Patent dated February 16, 1932. Disclaimer filed June 22, 1934, by the assignee, *I. G. Farbenindustrie Aktiengesellschaft*.

Therefore, enters this disclaimer to certain of the claims of the above identified patent, namely, claims 4, 5 and 6.

[*Official Gazette July 24, 1934.*]